US008318263B2

(12) United States Patent
Carlson et al.

(10) Patent No.: US 8,318,263 B2
(45) **Date of Patent: *Nov. 27, 2012**

(54) METHOD FOR COATING AN OBJECT WITH A GRAFT POLYMER LAYER

(75) Inventors: Mark F. Carlson, St. Louis Park, MN (US); Steven J. Porter, Minnetonka, MN (US); Sean M. Stucke, Farmington, MN (US); Ralph A. Chappa, Ham Lake, MN (US)

(73) Assignee: SurModics, Inc., Eden Prairie, MN (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/980,920

(22) Filed: Dec. 29, 2010

(65) Prior Publication Data

US 2011/0104392 A1 May 5, 2011

Related U.S. Application Data

(60) Continuation of application No. 11/375,487, filed on Mar. 14, 2006, now Pat. No. 7,883,749, which is a division of application No. 10/371,043, filed on Feb. 19, 2003, now Pat. No. 7,041,174.

(51) Int. Cl.

| | |
|---|---|
| ***C08F 2/46*** | (2006.01) |
| ***B05D 3/06*** | (2006.01) |
| ***B05C 3/02*** | (2006.01) |

(52) U.S. Cl. ...... 427/508; 427/595; 427/402; 427/430.1

(58) Field of Classification Search ....... 427/402–419.8, 427/430–443.2, 595, 301, 302, 333, 337, 427/340, 508

See application file for complete search history.

(56) References Cited

U.S. PATENT DOCUMENTS

| | | | | |
|---|---|---|---|---|
| 3,723,120 | A | 3/1973 | Hummel et al. | |
| 3,837,805 | A | 9/1974 | Boucher | |
| 4,016,306 | A | 4/1977 | Miyagawa et al. | |
| 4,148,934 | A | 4/1979 | Baker | |
| 4,196,231 | A | 4/1980 | Hubers | |
| 4,364,879 | A | 12/1982 | Gut et al. | |
| 4,415,654 | A | 11/1983 | Pohl | |
| 4,544,626 | A | 10/1985 | Sullivan | |
| 4,575,330 | A | 3/1986 | Hull | |
| 4,603,058 | A | 7/1986 | Adams | |
| 4,622,917 | A | 11/1986 | Schramm | |
| 4,575,330 | A | 12/1989 | Hull | |
| 4,927,741 | A | 5/1990 | Garth et al. | |
| 4,971,895 | A | 11/1990 | Sullivan | |
| 4,988,883 | A | 1/1991 | Oppawsky | |
| 5,002,582 | A | 3/1991 | Guire et al. | |
| 5,071,337 | A | 12/1991 | Heller et al. | |
| 5,076,974 | A | 12/1991 | Modrek et al. | |
| 5,248,752 | A | 9/1993 | Argyropoulos et al. | |
| 5,344,298 | A | 9/1994 | Hull | |
| 5,405,631 | A | 4/1995 | Rosenthal | |
| 5,414,075 | A | 5/1995 | Swan et al. | |
| 5,626,919 | A | 5/1997 | Chapman et al. | |
| 5,714,360 | A | 2/1998 | Swan et al. | |
| 5,858,435 | A | 1/1999 | Gallo | |
| 5,925,885 | A | 7/1999 | Clark et al. | |
| 6,001,425 | A | 12/1999 | Stash et al. | |
| 6,094,887 | A | 8/2000 | Swank et al. | |
| 6,165,526 | A | 12/2000 | Newman | |
| 6,207,337 | B1 | 3/2001 | Swain | |
| 6,245,089 | B1 | 6/2001 | Daniel et al. | |
| 6,278,018 | B1 | 8/2001 | Swan | |
| 6,279,505 | B1 | 8/2001 | Plester et al. | |
| 6,669,994 | B2 | 12/2003 | Swan et al. | |
| 6,752,959 | B2 | 6/2004 | Smith et al. | |
| 7,041,174 | B2 | 5/2006 | Carlson et al. | |
| 7,087,658 | B2 | 8/2006 | Swan et al. | |
| 7,105,350 | B2 | 9/2006 | Foster et al. | |
| 7,186,374 | B2 | 3/2007 | Zelina et al. | |
| 7,883,749 | B2 * | 2/2011 | Carlson et al. | ................ 427/508 |
| 2002/0159915 | A1 | 10/2002 | Zelina et al. | |
| 2009/0176030 | A1 | 7/2009 | Carlson et al. | |

FOREIGN PATENT DOCUMENTS

| | | | |
|---|---|---|---|
| EP | 0857516 A2 | | 2/1998 |
| JP | 63011547 | | 1/1988 |
| WO | WO-01/21326 A1 | | 3/2001 |
| WO | WO 01/21326 A1 | * | 3/2001 |
| WO | WO-01/94103 A2 | | 12/2001 |
| WO | WO-02/09786 A2 | | 2/2002 |
| WO | WO-03/024615 | | 3/2003 |

OTHER PUBLICATIONS

Braun, D., "Plastics", Concise Encyclopedia of Polymer Science and Engineering unknown , 462-464.

http://en.wikipedia.org/wiki/Cross-link; retrieved Nov. 6, 2009.

"PCT International Search Report and Written Opinion", from International Application No. PCT/US2007/072357, corresponding to U.S. Appl. No. 10/371,043, mailed Jul. 19, 2004, pp. 1-8.

"PCT Notification Concerning Transmittal of International Preliminary Report on Patentability", from International Application No. PCT/US2004/004486, corresponding to U.S. Appl. No. 10/371,043, mailed Sep. 1, 2005, pp. 1-6.

Hiemenz, "Polymer Chemistry the Basic Concepts", pp. 9 and 12.

* cited by examiner

*Primary Examiner* — William Phillip Fletcher, III

(74) *Attorney, Agent, or Firm* — Pauly, Devries Smith & Deffner, L.L.C.

(57) ABSTRACT

Described herein is a method for coating an object with a polymer layer. The method includes contacting the object with a first solution comprising a non-polymeric grafting initiator comprising at least one photoinitiator group capable of generating a free radical active species upon absorption of electromagnetic energy, wherein the photoinitiator group is selected from the group consisting of an initiator that is insoluble in polar solvent; and a negatively charged initiator; irradiating the first solution and the object, resulting in the grafting initiator binding to the object; removing the first solution; contacting the object with a second solution comprising a polymerizable monomer having at least one free-radical polymerizable group; and irradiating the second solution and the object, wherein the non-polymeric grafting initiator acts as a photoinitiator for a free-radical polymerization reaction.

20 Claims, 6 Drawing Sheets

METHOD FOR COATING AN OBJECT WITH A GRAFT POLYMER LAYER

REFERENCE TO CO-PENDING APPLICATIONS

This application is continuation of U.S. patent application Ser. No. 11/375,487, filed Mar. 14, 2006, now U.S. Pat. No. 7,883,749, which is a divisional application of U.S. patent application Ser. No. 10/371,043, entitled GRAFTING APPARATUS AND METHOD OF USING, filed Feb. 19, 2003, now U.S. Pat. No. 7,041,174, issued May 9, 2006, the content of which are hereby incorporated by reference in their entirety.

TECHNICAL FIELD

This invention relates to coating a surface of a device. In particular, this invention relates to an apparatus, and methods of using such for coating a device, such as an industrially or medically applicable device.

BACKGROUND ART

Many devices, including medical devices, are becoming increasingly complex in terms of function and geometry. These devices frequently require a coating to provide a desired function or feature, such as providing the device with particular chemical or physical characteristics. However, traditional coating methods, such as dip coating, are often undesirable for coating complex geometries since the coating solution may get entrapped in the device structure. This entrapped solution can cause webbing or bridging of the coating and can hinder the function of the device. Other methods, such as spray coating, have also been used to apply coatings to these devices. However, current methods of spray coating often introduce operator error, and can also result in reduced coating consistency. In addition, traditional coating methods generally use costly reagents inefficiently and therefore are expensive for the user.

Improved coating methods and the apparatus to implement these methods are needed in this area.

SUMMARY

The present invention provides an apparatus and methods for coating an object. In some implementations the apparatus comprises a plurality of containers, a gas supply source, an irradiation station, and a conveyor mechanism. In another implementation, the present invention provides a process for coating an object comprising, for example, the steps of placing the object into a container, filling the container with a first solution of nonpolymeric grafting initiator, irradiating the container, removing the solution from the container, filling the container with a second solution of polymerizable monomer or macromer, bubbling gas through the solution, irradiating the container, and removing the object from the container.

BRIEF DESCRIPTION OF THE DRAWINGS

FIGS. 1-6 are only provided by way of example and thus do not serve to limit the scope of the present invention.

FIG. 1 is an illustration of a coating apparatus made in accordance with an implementation of the current invention.

FIG. 2 is an illustration of the gas supply source of the coating apparatus of FIG. 1.

FIG. 3 is an illustration of the container of the coating apparatus of FIG. 1.

FIG. 4 is an illustration of the irradiation station of the coating apparatus of FIG. 1.

FIG. 5 is an illustration of a solution maintenance station of the coating apparatus of FIG. 1.

FIG. 6 is an illustration of an alternative solution maintenance station of the coating apparatus of FIG. 1.

DETAILED DESCRIPTION OF THE INVENTION

Figure 1:
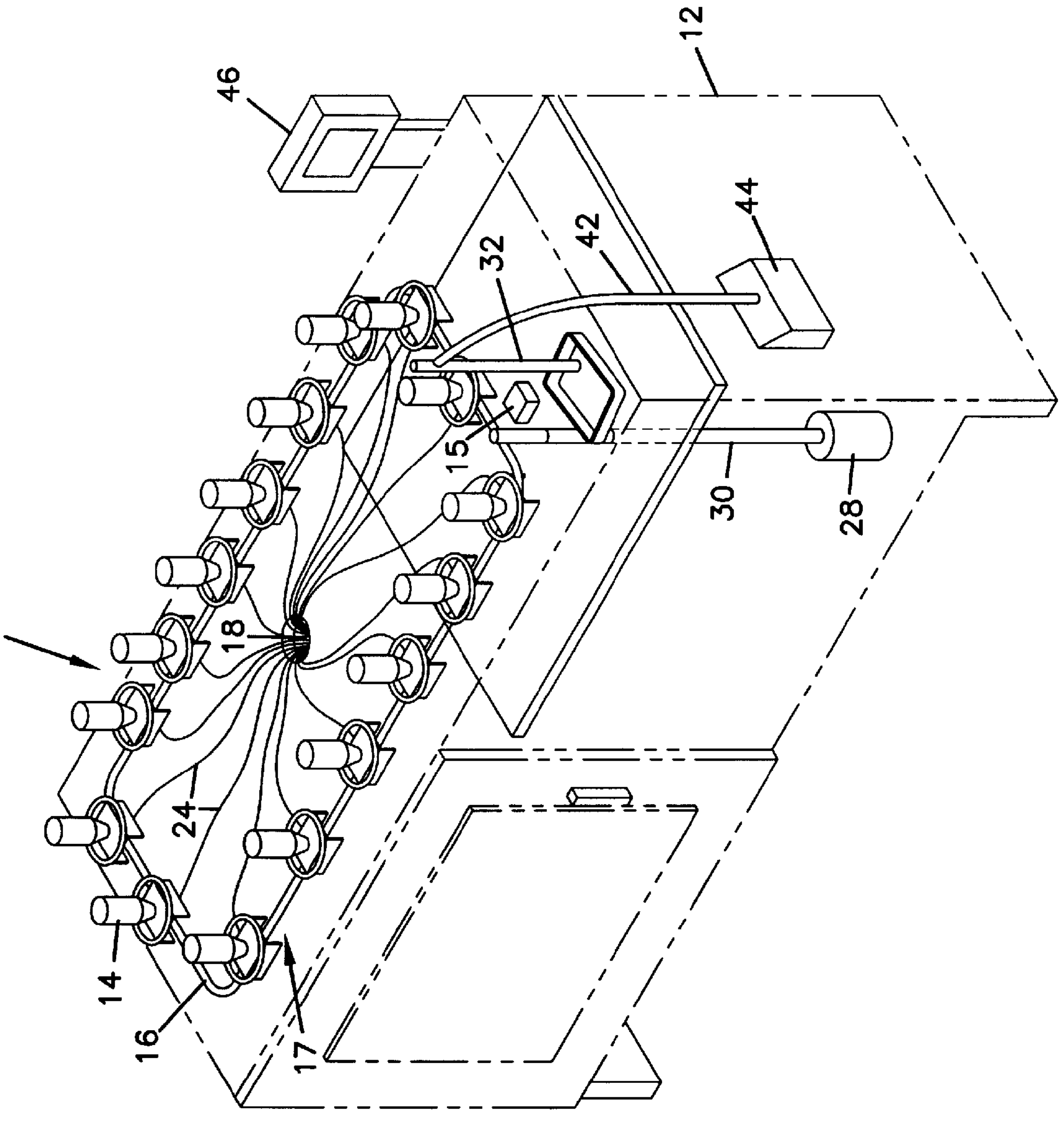
FIGS. 1-6 serve to illustrate aspects of the invention that can be included in some implementations. However.

In an embodiment, the invention provides an apparatus for coating a device with a photoactivatable compound and a polymerizable compound. "Photoactivatable compounds" includes compounds having two or more photoactivatable groups, the groups being same or different. The photoactivatable compound can also be referred to as a "grafting initiator". The coating apparatus can be automated, semi-automated, or manually operated, and can provide a safe and efficient approach to coating devices using solutions having a photoactivatable compound and a polymerizable compound.

The coating apparatus of the current invention, in some embodiments, can reduce the exposure of the operator to potentially hazardous agents, which include electromagnetic radiation, such as ultraviolet radiation, or toxic compounds, such as neurotoxic polymerizable monomers.

The coating apparatus can, in some embodiments, provide a cost-effective approach to coating devices by including features that reduce the waste of compounds or solutions used as coating reagents. Such features may include, for example, optimized container size and solution recycling mechanisms.

In an embodiment, the invention is directed to methods for coating devices with a photoactivatable compound and a polymerizable compound. In this method, a device to be coated is placed in a container. The container may contain or can be filled with a solution having a photoactivatable compound having at least two photoactivatable groups. The container having the device and solution is brought into the proximity of a radiation source that provides electromagnetic radiation to the photoactivatable compound in the container. The electromagnetic radiation activates at least one photoactivatable group of the photoactivatable compound, allowing the photoactivated compound to couple to the surface of the device. "Electromagnetic radiation" includes any sort of energy propagated in the form of electromagnetic waves, including ultraviolet light, which may activate the photogroups of a photoactivatable compound.

Following binding of the photoactivatable compound to the device, one or more photoactivatable groups remain pendent from the photoactivatable compound and are able to be subsequently activated by irradiation. Following binding of the photoactivatable compound to the surface of the device, a polymerizable compound is added to the container. In addition, an inert gas is supplied to the container purging air from a solution having the polymerizable compound. The solution having the polymerizable compound is then brought into the proximity of a radiation source. The radiation source provides electromagnetic radiation to the surface of the device and activates at least one pendent photoactivatable group of the bound photoactivatable compound. The term "pendent" or "latent" refers to photoactivatable groups that can be activated to form covalent bonds, for example, with the surface of the device or to provide a radical to initiate polymerization of the polymerizable compound. Activation of the pendent photoactivatable group initiates polymerization of the polymerizable compound in the presence of the bound photoactivatable agent, thereby forming a polymer coating on the surface of the device.

To further illustrate features that can be included in embodiments of the present invention, the coating apparatus, followed by select individual components, will now be described in greater detail.

A. Coating Apparatus

The apparatus for coating an object often includes a plurality of containers, a gas supply source in communication with the plurality of containers, at least one irradiation station for irradiation of the containers, and a conveyor mechanism to direct the containers to and from the irradiation station.

One embodiment of the invention is shown in FIG. 1 and it will be appreciated that other embodiments are also within the scope of the invention. In an embodiment, as illustrated in FIG. 1, the coating apparatus 10 includes a housing 12 on which a plurality of containers 14 are coupled to a conveyor track 16. The containers 14 can travel along the path of the conveyor track 16 to be delivered to any particular area on the top of the coating apparatus 10. The conveyor track 16 can allow the containers 14 to travel in either a clockwise or counter clockwise direction. The conveyor mechanism 17 can be driven by a conveyor motor 28 through a conveyor drive shaft 30 or other suitable motor mechanisms. Operation of the conveyor mechanism 17 can be controlled by a computerized control unit 46 or can be controlled manually.

In some embodiments, the coating apparatus can also include sensors for sensing the position of an object, for example, the position of the container, on the coating apparatus. Referring again to FIG. 1, the housing 12 can also include one or more conveyor sensors 15, which can detect the position of a container 14 along the conveyor track 16. Now referring to FIG. 3, which shows an embodiment of the container 14 and portion of the conveyor track 16 in greater detail, the container platform 31 also has a conveyor sensor trip 33 which can come into proximity of and actuate the conveyor sensor 15. Actuation of the conveyor sensor 15 may be through mechanical or other means. Actuation of the conveyor sensor 15 can send a message to the computerized control unit 46 (not shown) to modulate movement of the conveyor track 16.

According to the invention, the coating apparatus also includes a gas supply source that functions to supply the plurality of containers with an inert gas (i.e., the gas supply source is in gaseous communication with the containers). In one embodiment, the gas supply source functions to provide one or more containers with a source of gas while the containers are attached to the conveyor track and also when the containers are being moved by the conveyor track. The gas supply source can include a rotatable member that communicates gas to the containers while the containers are traveling on the conveyor mechanism.

Figure 2:
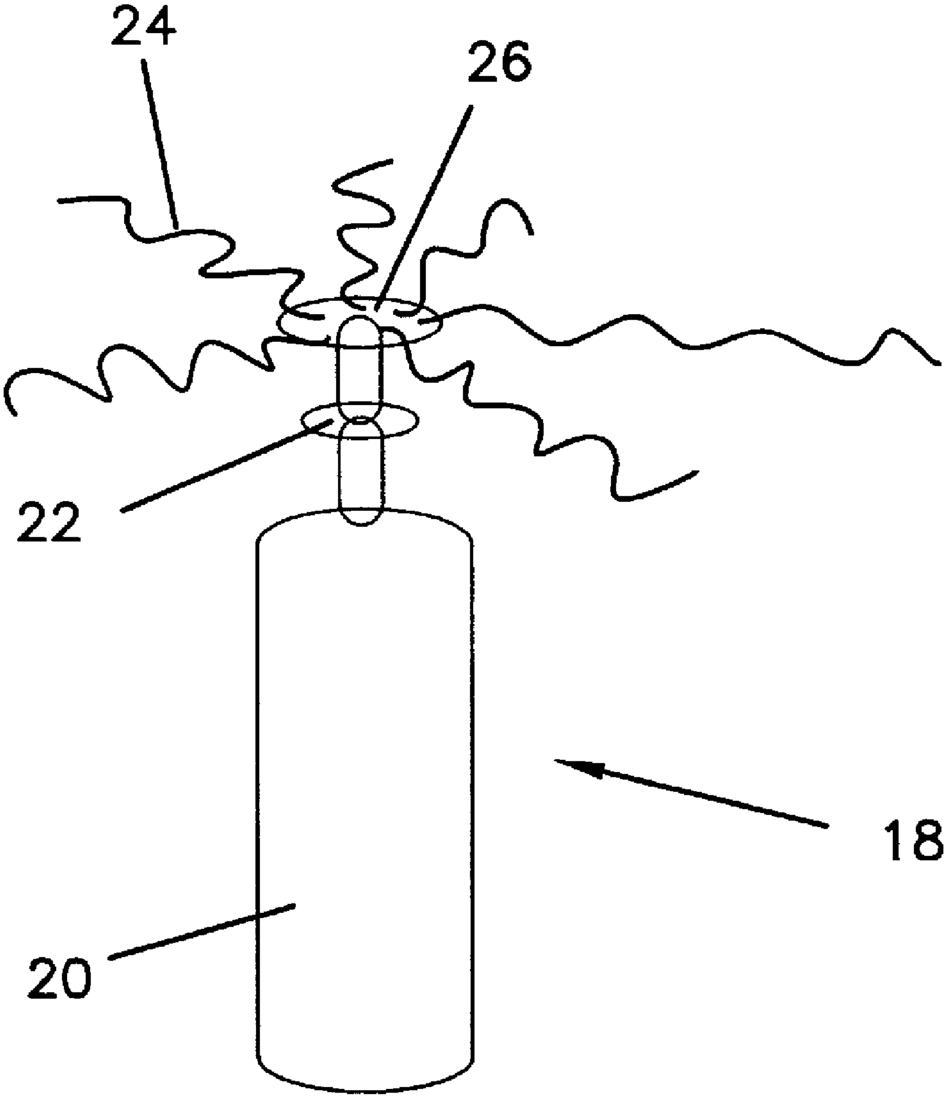

Referring to FIG. 2, showing an example embodiment, the gas supply source 18 can include gas tank 20, a gas pressure regulator 22, and a plurality of gas supply lines 24, each gas supply line 24 in gaseous communication with the container 14 (not shown). The gas supply lines can be any suitable device that can transport gas, including hoses, pipes, tubes, conduits, or ducts made from any suitable material such as rubbers, plastics, metals, or combinations thereof. The gas supply source 18 can include a rotating gas supply member 26 which allows the gas supply lines 24 to travel concurrently with the movement of the containers 14 as they are moved by the conveyor track 16, typically in a clockwise or counterclockwise direction. The rotating gas supply member 26 allows the gas supply lines 24 to travel concurrently with the movement of the containers 14. Typically, the gas tank 20 is stationary and does not rotate. However, in other embodiments portions of the gas supply source 18 can be rotatable and allow gas supply lines 24 to travel concurrently with the movement of the containers 14. The gas supply source 18 can provide an inert gas such as nitrogen, helium, or the like, to the container 14.

According to the invention, the coating apparatus also includes one or more irradiation stations. The irradiation stations generally function to provide electromagnetic energy to the containers having objects to be coated. The electromagnetic energy can activate the photoactivatable groups of the photoactivatable compound, the photoactivatable compound typically being in a solution in the container and surrounding the object to be coated.

The irradiation stations can be positioned at any place on the coating apparatus proximal to where the container is positioned. The irradiation stations can be placed inside or outside the conveyor track, and in some embodiments, and depending on the aspects of the housing of the coating apparatus, above or below the conveyor track.

Figure 4:
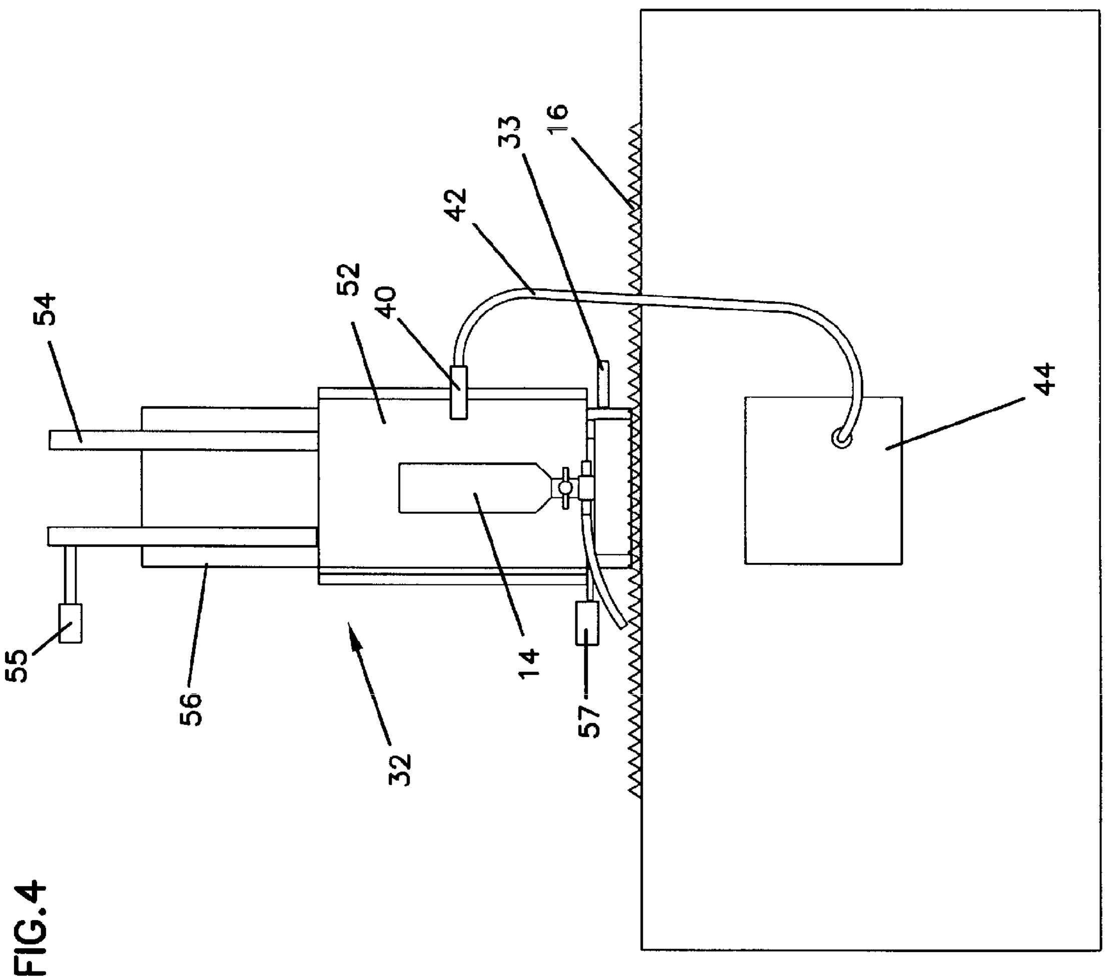

In one embodiment, and as shown in FIG. 4, the irradiation station 32 can include a radiation emitter 40, radiation emitter line 42, and radiation power supply 44. The radiation emitter 40 can be any suitable light source that emits electromagnetic energy in a wavelength sufficient to activate the photoactivatable compound used for the process of coating the device. Preferable light sources emit ultraviolet light at a wavelength that activates the photoactivatable groups of the photoactivatable compound. The wavelength range can be from 260-400 nm. Irradiation station 32 can also include one or more bandwidth or polarizing filters functioning to deliver a particular type of light to the container 14.

In a one embodiment, radiation emitter 40 is the end of an optical fiber and the radiation emitter line 42 is an optical fiber able to transmit light from the radiation power supply 44 to the radiation emitter 40. In another embodiment, the radiation emitter 40 is an ultraviolet light-emitting bulb and the radiation emitter line 42 is a wire that transmits electric current from the radiation power supply 44 to the radiation emitter 40. The irradiation station 32 can include one or more radiation emitters 40 and associated emitter lines 42.

The irradiation station 32 can provide light to the device in any desired manner. For example, the device can be irradiated for a defined period of time and at a desired light intensity. Function of the irradiation station 32 can also be coordinated with the movement of the containers 14 as they are moved by the conveyor mechanism 17. For example, the radiation emitter 40 can be activated to provide ultraviolet light to the device when the container 14 is in proximity to the irradiation station 32. Operation of the irradiation station 32 can be controlled by a computerized control unit 46 (shown in FIG. 1) or can be controlled manually.

B. Container

Figure 3:
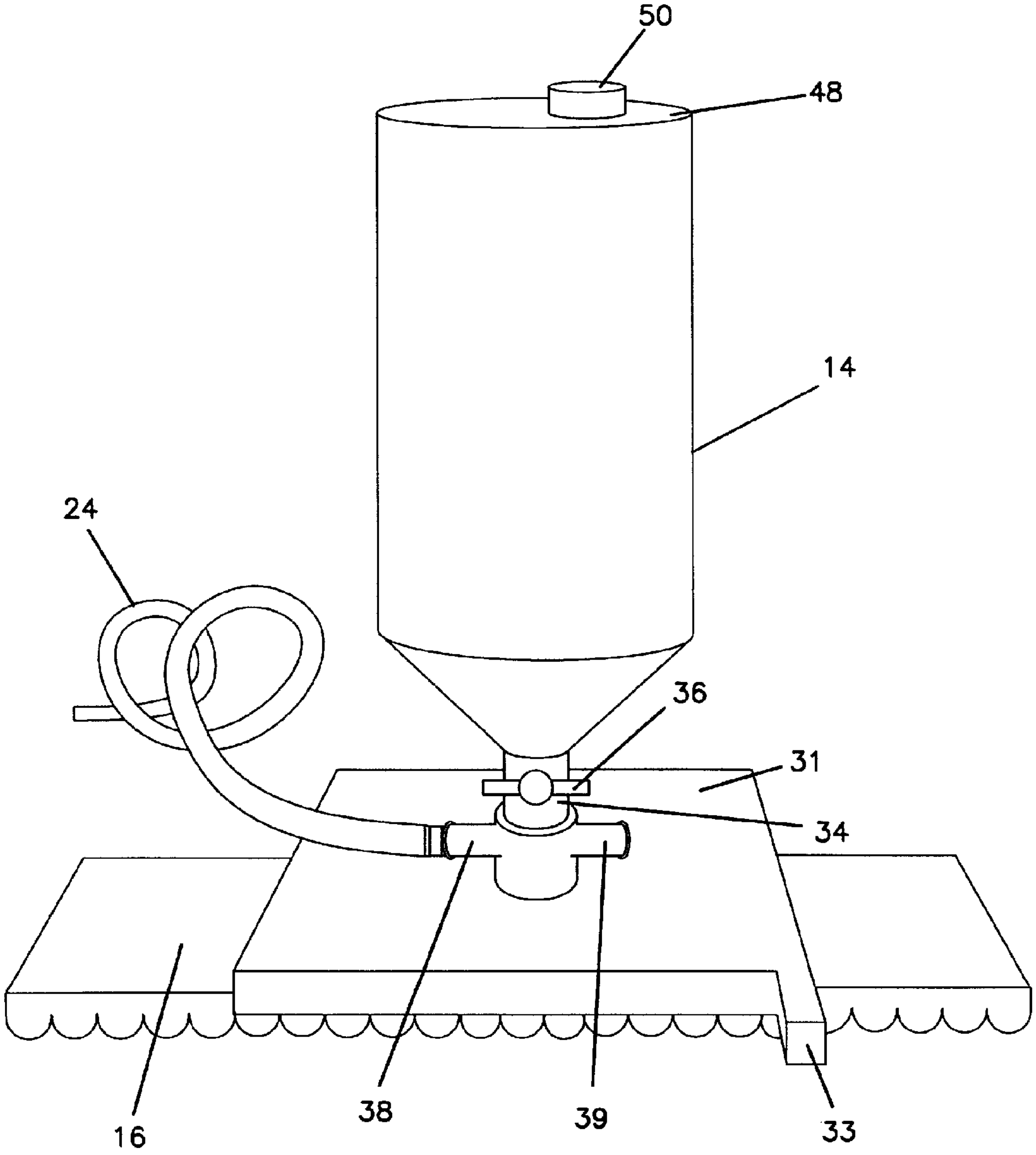

Container 14 is typically attached to conveyor track 16 which can include a belt, rail, wire, or chain feature to drive the movement of the container 14. In one embodiment, as illustrated in FIG. 3, container 14 can be mounted on top of a container platform 31 that is attached to conveyor track 16. The container platform can include a conveyor sensor trip 33 which can trigger the conveyor sensor 15 (shown in FIG. 1) to stop movement of the conveyor track 16. The conveyor sensor 15 can be positioned at any position on the housing 12 (shown in FIG. 1) in the path of the conveyor sensor trip 33 to stop movement of the conveyor track 16.

In some embodiments, the container of the coating apparatus can also include valves or switches that function to regulate the flow of gas from the gas supply source to the container. In other embodiments the container includes valves or switches that function to regulate the flow of liquids, for example, solutions used in the coating process. In some embodiments the valves and switches are useful for regulating the flow of both liquids and solutions to and from the container.

Some of these embodiments are illustrated in reference to FIG. 3, which shows that container 14 is attached to a container valve 34 having valve switch 36 which can be operated to regulate the flow of gas or liquids to and from container 14. Container valve 34 includes at least one container gas supply port 38 which is attached to gas supply line 24. In another embodiment, container valve 34 can also include at least one container liquid supply port 39. The liquid supply port 39 can be attached to a hose or a tube that can direct solution to or away from the container 14.

In one embodiment, the valve switch 36 can be adjusted to allow the container 14 to be open or closed to gas flow from the gas supply source 18. Gas can be supplied from the bottom of the container 14. In another embodiment, valve switch 36 can be adjusted so that the container is closed to both gas and liquid flow, open to only gas flow, open to only liquid flow, or open to both gas and liquid flow. Operation of the valve switch 36 can be controlled by a computerized control unit 46 (shown in FIG. 1) or can be controlled manually. For example, valve switch 36 can be actuated automatically when the container 14 reaches a certain position traveling along the conveyor mechanism 17. Automated actuation can regulate the flow of gas and solution to and from the container 14 at any point during the operation of the coating apparatus 10.

Container 14 can be composed of any suitable material that transmits light, for example, ultraviolet radiation, from the radiation emitter 40 to the device in the container 14. Suitable materials include glass, Pyrex™ materials, and the like. Generally, the container 14 is made of compounds that do not have abstractable hydrogen ions or from compounds that contain a low percentage of compounds with abstractable hydrogen ions. In one embodiment, the container 14 can be, or can be a derivative of, a glass syringe commercially available from, for example, Popper and Sons, Inc. (Lincoln, R.I. 02865-4615) or Becton Dickinson (Franklin Lakes, N.J. 07417). An advantageous feature of the current invention is that glass syringes are commercially available in a variety of sizes and are easily removable from the container valve 34. This offers the user a cost effective way of changing the container size to accommodate the device to be coated. Appropriate container size also reduces the amount of solution containing either the photoactivatable compound or polymerizable compound used to surround the device during the coating process.

In another embodiment, the container 14 can also include a container lid 48. The container lid 48 can include a lid valve 50 which can be adjusted to allow the escape of gas from the inside of the container 14 when the internal pressure reaches a predetermined level. The container lid 48 can be attached to the container 14 by, for example, a hinge, to allow easy access to the container 14.

C. Irradiation Station

As previously indicated, one or more irradiation stations can be positioned at any place on the coating apparatus proximal to where the container is positioned. In one embodiment, the irradiation station includes a shielding member and the shielding member functions to protect the user from radiation or increase the reflected radiation within the shielding member, or both. In another embodiment the shielding member is movable. Generally the shielding member can be moved on the irradiation station to encompass at least a portion of the container 14.

Also, one or more portions of the irradiation station can function to emit electromagnetic radiation. In one embodiment, the radiation emitter portion of the irradiation station is attached to and movable with the radiation shield. In another embodiment, the radiation emitter portion of the irradiation station is not attached to the radiation shield. Generally, the radiation emitter can be positioned at any place on the irradiation station sufficient to provide a desired dose of electromagnetic energy to the container 14.

Referring to the embodiment shown in FIG. 4, the irradiation station 32 includes a movable radiation shield 52 that is connected to one or more shield lifting posts 54 and a lift housing 56. A cross section of the radiation shield 52 is illustrated encompassing a container 14. The radiation shield 52 can be cylindrical shaped, for example, wherein the bottom portion of the radiation shield 52 is open to allow placement of the container 14 within. Other shapes of the radiation shield are also contemplated; these include cup and half cup-shaped shields that can be moved in a swinging or flipping movement on the irradiation station. The radiation shield 52 can also be connected to the radiation emitter 40 that is situated to direct light into and within the radiation shield 52. One or more radiation emitters 40 can be connected to the radiation shield 52 at any desired location or angle. In some embodiments, optical fibers from the radiation emitter 40 can be distributed on the inside of the radiation shield 52. The radiation emitter line 42 is of sufficient length to allow movement of the radiation shield up and down.

The radiation shield 52 can move vertically on the shield lifting post or posts 54. The shield lifting post or posts 54 guide the movement of the radiation shield 52 up and down. The lift housing 56 typically includes a suitable device such as a motor or an air cylinder that drives the movement of the radiation shield 52. In a down position, the radiation shield 52 encompasses the container 14 and light can be provided to the container 14. In an up position, the container 14 is able to move away from the irradiation station 32 via the conveyor track 16.

The radiation shield 52 can be fabricated from any suitable material. Suitable materials include those that do not transmit ultraviolet light including metals, such as aluminum or steel. An example of such a material is reflective aluminum. The interior of the radiation shield 52 can also be prepared, for example by coating or polishing, to provide an interior that is highly reflective to ultraviolet radiation. A highly reflective interior can be useful to achieve a high degree of uniform coating of the photoactivatable compound and polymerizable compound, and can also reduce the duration and intensity of the light emission during the step of irradiating the device. The radiation shield 52 also provides an increased level of safety to the user by minimizing or eliminating the amount of radiation exposed to the user during the step of irradiating.

Operation of the irradiation station 32 can be automated or can be controlled manually and can be coordinated with the operation of the conveyor track 16. For example, the conveyor track 16 can bring the container 14 into the proximity of the irradiation station 32 via the conveyor track 16 when the radiation shield 52 is in the up position. When the container 14 is properly situated under the radiation shield 52, the motor or air cylinder of the lift housing 56 can be actuated to lower the radiation shield 52 down the shield lifting post or posts 54 surrounding the container 14.

The irradiation station 32 can include an upper sensor 55 and a lower sensor 57 to determine the location of the radiation shield 52 in the up and down positions, respectively. For example, proximity sensors can be used for the upper sensor 55 and a lower sensor 57. Prior to the container 14 being positioned proximal to the irradiation station 32, the radiation shield 52 is typically in the up position. When the container 14 becomes properly positioned (i.e., when the conveyor sensor is triggered by the conveyor trip and the movement of the conveyor track is stopped), the radiation shield 52 is lowered to a point where the lower sensor 57 is triggered. Upon triggering of the lower sensor 57, the irradiation power supply 44 can be actuated to provide light or energy to the container 14 within the radiation shield 52. After an amount of light is delivered to the container 14, the radiation shield 52 can be raised to a level on the irradiation station 32 where the upper sensor 55 is activated and the container 14 is free to pass below the radiation shield 52.

D. Solution Maintenance Station

In one embodiment of the invention, the coating apparatus can also include a solution maintenance station to provide a solution to, or remove a solution from, one or more containers. The solution maintenance station can generally function to provide or remove one or more solutions involved in the coating process. The solution maintenance station can be positioned at any place on the coating apparatus proximal to where the container is positioned. The solution maintenance station generally functions to establish a fluid connection between the container and one or more reservoirs that contain solutions involved in the coating process.

In one embodiment the solution maintenance station establishes a fluid connection between a portion of the container that includes valves or switches that can regulate the flow of liquid or gas in and out of the container. For example, a portion of the solution maintenance station can establish a fluid connection with the container that allows solution to be provided, removed, or both, from the lower portion (i.e., bottom) of the container. In another embodiment the solution maintenance station can provide solution to the top of the container.

Figure 5:
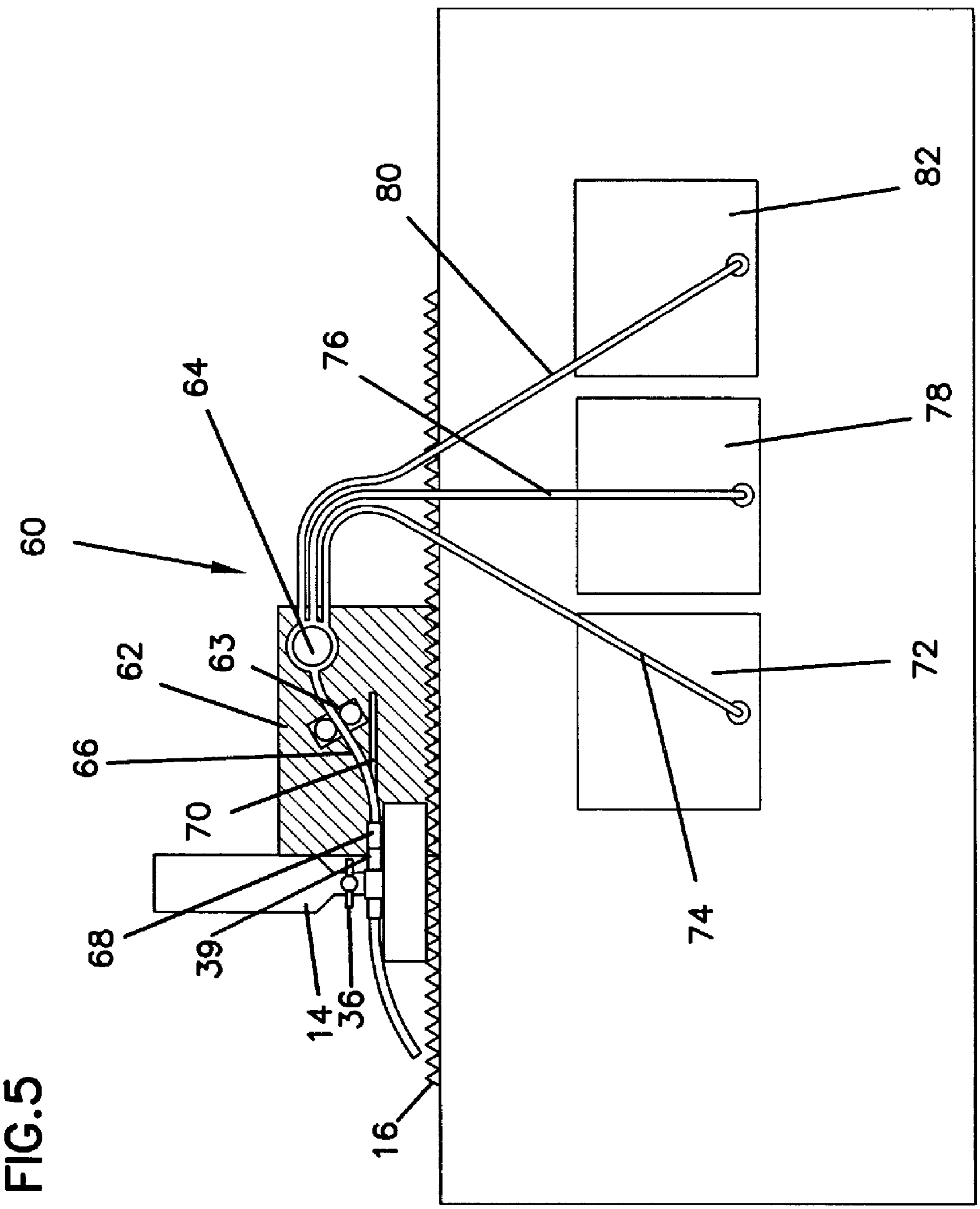

Some of these embodiments are illustrated in reference to FIG. 5, which illustrates that solution maintenance station 60 includes a housing 62 having a pump 63 that is able to supply or withdraw solution from the container 14 through a series of lines. The movement of solution to and from the container 14 can be accomplished by attaching a container liquid supply line 66 to the container liquid supply port 39 via a container port adapter 68, all of which are in fluid connection. A movable supply line insertion mechanism 70 can connect the container port adapter 68 to the container liquid supply port 39 when the container 14 is properly positioned next to the solution maintenance station 60. Valve switch 36 of the container 14 can be actuated manually or automatically to allow the flow of solutions from the container 14 to the container liquid supply line 66 or from the container liquid supply line 66 to the container 14.

The container liquid supply line 66 is in fluid connection with a solution maintenance station valve 64 that is in fluid connection with one or more reservoir lines. In one embodiment, as illustrated in FIG. 5, the solution maintenance station valve 64 is in fluid connection with a first reservoir line 74, second reservoir line 76, and third reservoir line 80, which are in fluid connection with first reservoir 72, second reservoir 78, and third reservoir 82, respectively. Solutions having the photoactivatable compound, the polymerizable compound, or a wash solution can be disposed in any of the reservoirs. Solution maintenance station valve 64 can be actuated, either manually or automatically, to direct liquid flow between the liquid supply line 66 and any of the first 74, second 76, or third reservoir line 80. Optionally, solution maintenance station valve 64 can be actuated to a position for disposal of fluid withdrawn from the container 14.

Operation of the solution maintenance station 60 can be automated or can be controlled manually and can be coordinated with the operation of the conveyor track 16 and the gas supply source 18 (not shown). For example, the conveyor track 16 can transport the container 14 into the proximity of the solution maintenance station 60 with the container port adapter 68 in a retracted position. When the container 14 is properly situated next to the solution maintenance station 60, the supply line insertion mechanism 70 can move and insert the container port adapter 68 into the container liquid supply port 39. The solution maintenance station 60 can include a sensor, for example, an optical sensor, to detect proper positioning of the container 14 in relation to the solution maintenance station 60.

When the container port adapter 68 is properly fit into the container liquid supply port 39 and the valve switch 36 and solution maintenance station valve 64 are actuated to allow flow of solution in and out of the container, the pump 63 can be operated to withdraw fluid from any of the reservoirs and into the container 14. The pump 63 can be operated to deliver an amount of liquid into the container 14 at a desired rate. If the container 14 is to be transported to another location on the coating apparatus 10 (shown in FIG. 1), for example, the irradiation station 32, the pump 63 can be stopped and the valve switch 36 and solution maintenance station valve 64 closed to prevent loss of fluid from the container. The movable supply line insertion mechanism 70 can disconnect and retract the container port adapter 68 from the container liquid supply port 39. The container 14 can be moved away from the solution maintenance station 60 via the conveyor track 16.

Removal of fluids from the container 14 can be achieved by operating the pump 63 in a reverse mode to either draw the liquids back into a reservoir for recycling of the solution, or to a disposal outlet.

Figure 6:
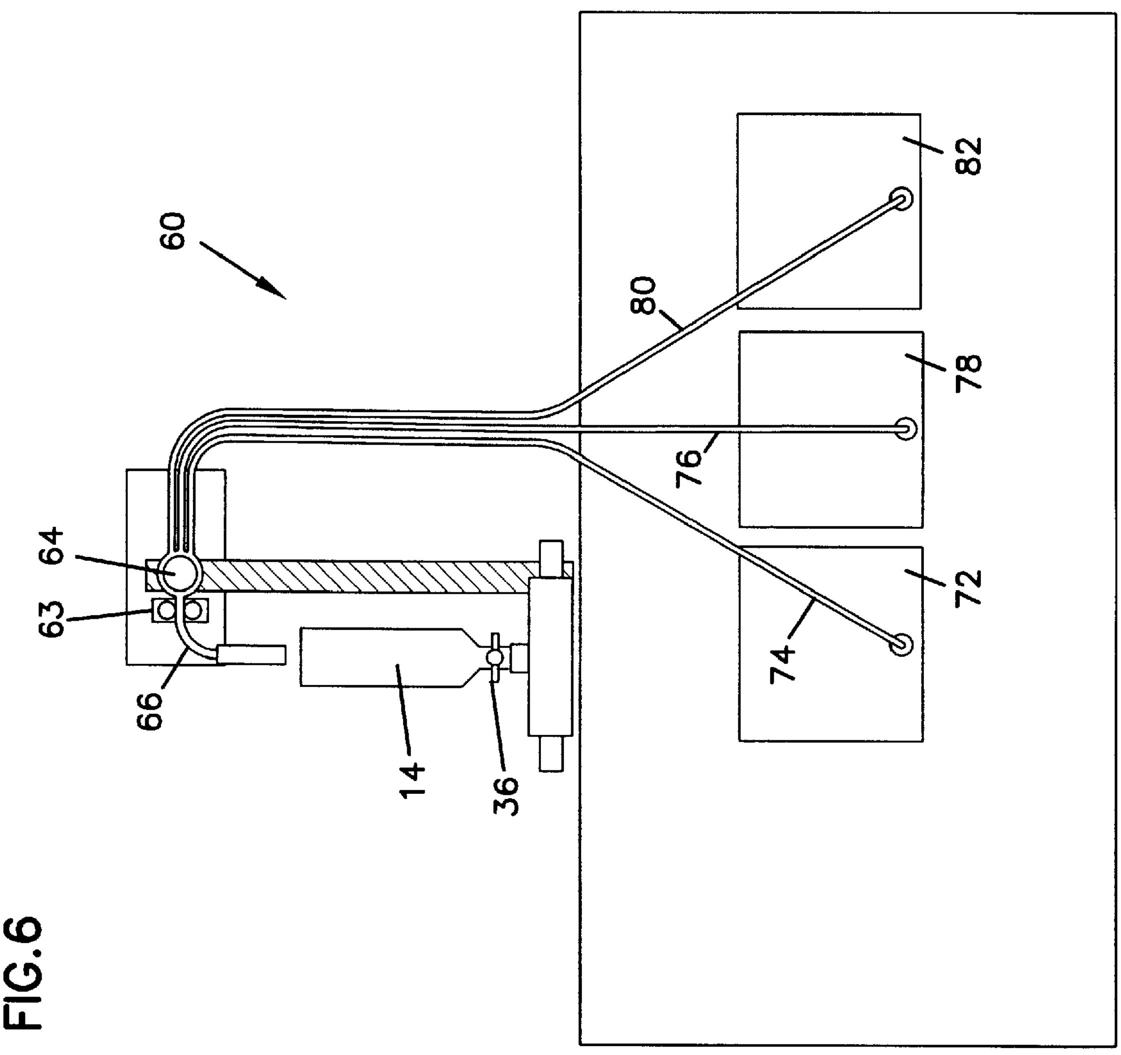

In another embodiment, illustrated in FIG. 6, the solution maintenance station 60 is depicted in a top-dispensing configuration. When the valve switch 36 of the container 14 is closed to solution flow, pump 63 can allow the withdrawal of fluid from any reservoir, through the solution maintenance station valve 64 and container liquid supply line 66 and into the container 14. The solution maintenance station valve 64 is in fluid connection with a first reservoir line 74, second reservoir line 76, and third reservoir line 80, which are in fluid connection with first reservoir 72, second reservoir 78, and third reservoir 82, respectively. Solutions having the photoactivatable compound, the polymerizable compound, or a wash solution can be disposed in any of the reservoirs. Solution maintenance station valve 64 can be actuated, either manually or automatically, to direct liquid flow between the liquid supply line 66 and any of the first 74, second 76, or third reservoir lines 80. Removal of liquids from the container 14 can be accomplished by actuating the valve switch 36 to allow the flow of solution from the container 14 into a disposal unit.

E. Automated Control Unit

Referring to FIG. 1, coating apparatus 10 also includes a computerized control unit 46 to provide an automated system for operation of the conveyor track 16, the gas supply source 18, the irradiation station 32, and, in some embodiments, the solution maintenance station 60 (shown in FIGS. 5 and 6). The computerized control unit 46 can regulate and coordinate operation of parts of the coating apparatus 10, for example: the speed, movement, and positioning of the conveyor track 16 in both clockwise and counterclockwise directions; the flow of gas from the gas supply source 18, including pressure and duration of gas flow and the flow of gas; referring to FIG. 4, the movement of the radiation shield 52 of the irradiation station 32 and the emission of light by operation of the radiation power supply 44; and, referring to FIG. 5, the flow of fluids to and from the container 14 via the pump 63 of the solution maintenance station 60. The computerized control unit can receive and integrate signals from the conveyor sensor 15, and, referring to FIG. 4, the upper sensor 55, and lower sensor 57, of the irradiation station 32.

In another embodiment, the coating apparatus can be manually operated, for example, by filling and dumping solutions from the container by hand.

F. Modes of Operation

According to the invention, a device to be coated is placed in the container 14. Placement of the device into the container 14 can be carried out manually or by an automated or robotic system. The device placed into the container can be any device suitable for coating with the photoactivatable compound and polymerizable compound utilized in the invention. Such devices may be medical devices, including those adapted for use within or upon the body. Medical devices that are permanently implanted in the body for long-term use or short-term use are one general class of suitable devices.

Long-term devices include, but are not limited to, grafts, stents, stent/graft combinations, valves, heart assist devices, shunts, and anastomoses devices; catheters such as central venous access catheters; orthopedic devices such as joint implants, fracture repair devices, and artificial tendons, dental implants and dental fracture repair devices; intraocular lenses; surgical devices such as sutures and patches; synthetic prosthesis; and artificial organs such as artificial lung, kidney, and heart devices.

Short-term devices include, but are not limited to, vascular devices such as distal protection devices; catheters such as acute and chronic hemodialysis catheters, cooling/heating catheters, and percutaneous transluminal coronary angioplasty (PTCA) catheters; ophthalmic devices such as contact lenses and glaucoma drain shunts.

Other biomedical devices can also be coated, in whole or in part, using the apparatus and method of the present invention. These other biomedical devices include, but are not limited to, diagnostic slides such as gene chips, DNA chip arrays, microarrays, protein chips, and fluorescence in situ hybridization (FISH) slides; arrays, including cDNA arrays and oligonucleotide arrays; blood sampling and testing components; functionalized microspheres; tubing and membranes, e.g., for use in dialysis or blood oxygenator equipment; and blood bags, membranes, cell culture devices, chromatographic support materials, biosensors, and the like.

The apparatus and method for using the apparatus this invention are particularly well suited for coating devices such as distal protection devices (also known as emboli catching devices), e.g., of the type described in U.S. Pat. No. 6,245,089, the disclosure of which is incorporated herein by reference The devices to be coated by the apparatus and method of the invention can be made of any material that can suitably react with the photoactivatable compound. Examples of materials used to provide suitable device surfaces include polyolefins, polystyrenes, poly(alkyl)methacrylates and poly (alkyl) acrylates, polyacrylonitriles, poly(vinylacetates), poly(vinyl alcohols), chlorine-containing polymers such as poly(vinyl) chloride, polyoxymethylenes, polycarbonates, polyamides, polyimides, polyurethanes, polyvinylidene difluoride (PVDF), phenolics, amino-epoxy resins, polyesters, silicones, polyethylene terephthalates (PET), polyglycolic acids (PGA), poly-(p-phenyleneterephthalamides), polyphosphazenes, polypropylenes, parylenes, silanes, and silicone elastomers, as well as copolymers and combinations thereof, as well as cellulose-based plastics, and rubber-like plastics. See generally, "Plastics," pp. 462-464, in *Concise Encyclopedia of Polymer Science and Engineering*, Kroschwitz, ed., John Wiley and Sons, 1990, the disclosure of which is incorporated herein by reference.

Parylene is the generic name for members of a unique polymer (poly-p-xylylene) series, several of which are available commercially (e.g., in the form of "Parylene C", "Parylene D" and Parylene N", from Union Carbide). For example, "Parylene C", is a poly-para-xylylene containing a substituted chlorine atom, and can be used to create a moisture barrier on the surface of a medical device. Parylene C can be coated by delivering it in a vacuum environment at low pressure as a gaseous polymerizable monomer. The monomer condenses and polymerizes on substrates at room temperature, forming a matrix on the surface of the medical device. The coating thickness is controlled by pressure, temperature, and the amount of monomer or macromer used, in order to provide an inert, non-reactive barrier. In addition, materials such as those formed of pyrolytic carbon and silylated surfaces of glass, ceramic, or metal are suitable for coating according to the method of the invention.

According to the method of the invention, the device can be placed into container 14 that has been filed with a solution having a photoactivatable compound, or the solution can be added after the device has been placed into the container 14. In one embodiment, the device is placed into the container 14 and then the container 14 is filled with a solution that contains a photoactivatable compound. In an alternate embodiment, the solution can be dispensed into the top of the container 14 manually in an amount sufficient to cover the device.

In another embodiment, the container 14 is brought into the proximity of a solution maintenance station 60, as illustrated in FIG. 5, via the conveyor track 16, and filled with a solution containing the photoactivatable compound. The container 14 can be properly positioned next to the solution maintenance station 60 following movement of the conveyor track 16 to where the conveyor sensor trip 33 (shown in FIG. 3) actuates the conveyor sensor 15 (shown in FIG. 1) and stops movement of the conveyor track 16. When the container 14 is properly situated next to the solution maintenance station 60, the supply line insertion mechanism 70 can move and insert the container port adapter 68 into the container liquid supply port 39. The container port adapter 68 is then properly fit into the container liquid supply port 39 and the valve switch 36 is actuated to allow fluid into the container 14. The solution maintenance station valve 64 is actuated to allow input of the solution that contains a photoactivatable compound from the first reservoir line 74 and the first reservoir 72. The pump 63 can then be operated to withdraw solution that contains a photoactivatable compound from first reservoir 72 and ultimately into the container 14. The pump 63 can be operated to deliver a selected amount of solution that contains a photoactivatable compound into the container 14, generally in an amount sufficient to cover the device.

Suitable polymerizable monomer or macromer reagents are described, for instance, in PCT/US99/21247 entitled "Water-Soluble Coating Agents Bearing Initiator Groups And Coating Process" the disclosure of which is incorporated by reference. Such polymerizable monomers include hydrophilic monomers that are negatively charged, positively charged, or electrically neutral. Examples of suitable monomers containing electrically neutral hydrophilic structural units include acrylamide, methacrylamide, N-alkylacrylamides (e.g., N,N-dimethylacrylamide or methacrylamide, N-vinylpyrrolidinone, N-vinylacetamide, N-vinyl formamide, hydroxyethylacrylate, hydroxyethylmethacrylate, hydroxypropyl acrylate or methacrylate, glycerolmonomethacrylate, and glycerolmonoacrylate). Examples of suitable monomeric polymerizable molecules that are negatively charged at appropriate pH levels include acrylic acid, methacrylic acid, maleic acid, fumaric acid, itaconic acid, AMPS (acrylamidomethylpropane sulfonic acid), vinyl phosphoric acid, vinylbenzoic acid, and the like. Examples of suitable monomeric molecules that are positively charged at appropriate pH levels include 3-aminopropylmethacrylamide (APMA), methacrylamidopropyltrimethylammonium chloride (MAPTAC), N,N-dimethylaminoethylmethacrylate, N,N-diethylaminoethylacrylate, and the like.

In an alternative embodiment, the polymerizable compounds of the present invention comprise macromeric polymerizable molecules. Suitable macromers can be synthesized from monomers such as those illustrated above. According to the present invention, polymerizable functional components (e.g., vinyl groups) of the macromer can be located at either terminus of the polymer chain, or at one or more points along the polymer chain, in a random or nonrandom structural manner.

The number of free-radical polymerizable groups per molecule can be varied according to the application. For example, it can be preferable to employ a macromer with just one free-radical polymerizable unit. In other instances, however, it can be preferable to employ a macromer with more than one, e.g., two or more polymerizable units per macromer. Additionally, the macromer of the present invention can contain structural features to provide improved affinity for water in a manner typically unavailable in small molecule structures (e.g., hydrophilic poly(ethylene glycol) materials).

Examples of suitable macromeric polymerizable compounds include methacrylate derivatives, monoacrylate derivatives, and acrylamide derivatives. Particularly preferred macromeric polymerizable compounds include poly(ethylene glycol)monomethyacrylate, methoxypoly(ethylene glycol)monomethacrylate, poly(ethylene glycol) monoacrylate, monomethyacrylamidopoly(acrylamide), poly(acrylamide-co-3-methacrylamidopropylacrylamide), poly(vinylalcohol)monomethacrylate, poly(vinylalcohol) monoacrylate, poly(vinylalcohol)dimethacrylate, and the like.

Such macromers can be prepared, for instance, by first synthesizing a hydrophilic polymer of the desired molecular weight, followed by a polymer modification step to introduce the desired level of polymerizable (e.g., vinyl) functional units. For example, acrylamide can be copolymerized with specific amounts of 3-aminopropylmethacrylamide comonomer, and the resulting copolymer can then be modified by reaction with methacrylic anhydride to introduce the methacrylamide functional units, thereby producing a useful macromer for purposes of this invention.

Poly(ethylene glycol) of a desired molecular weight can be synthesized or purchased from a commercial source, and modified (e.g., by reaction with methacrylyl chloride or methacrylic anhydride) to introduce the terminal methacrylate ester units to produce a macromer useful in the process of this invention. Some applications can benefit by use of macromers with the polymerizable units located at or near the terminus of the polymer chains, whereas other uses can benefit by having the polymerizable unit(s) located along the hydrophilic polymer chain backbone.

Such monomeric and macromeric polymerizable molecules can be used alone or in combination with each other, including for instance, combinations of macromers with other macromers, monomers with other monomers, or macromers combined with one or more small molecule monomers capable of providing polymeric products with the desired affinity for water. Moreover, the above polymerizable compounds can be provided in the form of amphoteric compounds (e.g., zwitterions), thereby providing both positive and negative charges.

The photoactivatable compound has at least one first photoactivatable group able to be activated by the irradiation provided by the irradiation station 32 and form a covalent bond with the surface of the device. The photoactivatable compound also has at least one second photoactivatable group able to be activated to initiate the polymerization of a polymerizable compound. The second photoactivatable group can also be activated by irradiation provided by the irradiation station. Photoactivatable groups that are able to be activated to, for example, form covalent bonds with the surface of the device or to provide a radical to initiate polymerization of the polymerizable compound, can also be referred to as "pendent" or "latent reactive" groups. These also include photoactivatable groups that have been activated but have returned to a ground state and capable of being subsequently activated.

According to one method of using the apparatus and the compounds described herein, upon irradiation of the photoactivatable compound in the presence of a device, the first photoactivatable group is capable of covalently bonding to the device surface, and upon bonding of the first photoactivatable groups to the surface, the second photoactivatable group is: i) restricted from reacting with either a spacer or the device surface, ii) capable of reverting to an inactive state, and iii) upon reverting to their inactive state, are thereafter capable of being reactivated in order to later initiate polymerization of a polymerizable compound, thereby forming a polymer on the surface.

The first and second photoactivatable groups can be of the same or different types, and the distinction between the two can be determined under the conditions, and at the time of use. Generally, the first photoactivatable group is defined (from amongst those originally present) as one or more photoactivatable groups of the photoactivatable compound that become attached to the surface of the device. This serves to define the second photoactivatable group (i.e., as pendent or latent reactive) as one or more photoactivatable groups of the bound photoactivatable compound that are not covalently attached to the surface of the device, and hence revert to an activatable form. According to the invention, it has been discovered that the second photoactivatable groups are particularly well suited to serve as photoinitiators for a polymerization reaction. Without intending to be bound by theory, it appears that the utility of such photoactivatable compounds for use in grafting is improved also by the photoactivatable compound's lack of solubility in polar solvent. The photoactivatable compound, or grafting initiator, of this type of invention can be selected from the group consisting of tetrakis(4-benzoylbenzyl ether), the tetrakis(4-benzoylbenzoate ester) of pentaerythritol, and an acylated derivative of tetraphenylmethane.

The apparatus can also utilize photoactivatable compounds comprising a nonpolymeric core molecule having attached thereto, either directly or indirectly, one or more substituents comprising negatively charged groups, and two or more photoactivatable species, wherein the photoactivatable species are provided as discrete photoactivatable groups. The photoactivatable species comprise one or more of the first photoactivatable groups adapted to attach the photoactivatable compound to a surface, and one or more second photoactivatable groups adapted to initiate photopolymerization of the polymerizable compound. Suitable reagents of this type are described, for instance, in U.S. Pat. No. 6,278,018 entitled "Surface Coating Agents" the disclosure of which is incorporated by reference.

The photoactivatable compound can comprise a conjugated cyclic diketone having attached thereto, either directly or indirectly, one or more substituents comprising negatively charged groups, and wherein each ketone group of the diketone is adapted to serve as a photoactivatable moiety capable of being activated in order to provide a free radical. The conjugated cyclic diketone can be a quinone selected from substituted and unsubstituted benzoquinone, camphorquinone, naphthoquinone, and anthraquinone.

Such photoactivatable compounds can comprise a nonpolymeric core molecule having attached thereto, either directly or indirectly, one or more substituents comprising negatively charged groups, and two or more photoactivatable groups. Such photoactivatable compounds can be selected from the group 4,5-bis(4-benzoylphenylmethyleneoxy)benzene-1,3,-disulfonic acid dipotassium salt, 2,5-bis(4-benzoylphenylmethyleneoxy)benzene-1,4-disulfonic acid dipotassium salt, 2,5-bis(4-benzoylphenylmethyleneoxy) benzene-1-sulfonic acid mono (or di-) sodium salt, a hydroquinone monosulfonic acid derivative, an anthraquinone sulfonic acid salt, and a camphorquinone derivative. Optimally, the photoactivatable compound is selected from 4,5-bis(4-benzoylphenylmethyleneoxy)benzene-1,3,-disulfonic acid dipotassium salt, 2,5-bis(4-benzoylphenylmethyleneoxy)benzene-1,4-disulfonic acid dipotassium salt, and 2,5-bis(4-benzoylphenylmethyleneoxy) benzene-1-sulfonic acid mono (or di-) sodium salt.

Photoactivatable compounds of this type can be selected from the group 4,5-bis(4-benzoylphenylmethyleneoxy)benzene-1,3-disulfonic acid dipotassium salt, and 2,5-bis(4-benzoylphenylmethyleneoxy)benzene-1,4-disulfonic acid dipotassium salt.

The photoactivatable compound of the present invention can be provided in the form of an initiator of the general formula:

X—Y—X wherein each X is independently a photoactivatable group and Y is a portion of the photoactivatable compound that has one or more charged groups. Such initiators are described, for instance, in Applicant's U.S. Pat. No. 5,714,360, the disclosure of which is incorporated herein by reference.

An initiator of this type includes one or more charged groups, and optionally one or more additional photoactivatable groups, included in the radical identified in the empirical formula as "Y." A "charged" group, when used in this sense, refers to groups that are present in ionic form, i.e., carry an electrical charge under the conditions (e.g., pH) of use. The charged groups are present, in part, to provide the compound with the desired water solubility.

Preferred Y groups are nonpolymeric, that is, they are not formed by polymerization of any combination of monomers or macromers. Nonpolymeric agents are preferred since they will tend to have lower molecular mass, which in turn means that they can generally be prepared to have a higher ratio of photoactivatable groups per unit mass. In turn, they can generally provide a higher coating density of photoactivatable groups than comparable photoactivatable polymeric agents.

The type and number of charged groups of the photoactivatable compound are sufficient to provide the agent with a water solubility (at room temperature and optimal pH) of at least about 0.1 mg/ml, 0.5 mg/ml or up to 5 mg/ml. Given the nature of the surface coating process, photoactivatable compound solubility levels of at least about 0.1 mg/ml are generally adequate for providing useful coatings of target molecules on surfaces.

Examples of suitable charged groups include, but are not limited to, salts of organic acids (such as sulfonate, phosphonate, and carboxylate groups), onium compounds (such as quaternary ammonium, sulfonium, and phosphonium groups), and protonated amines, as well as combinations thereof. An example of an agent employing charged groups other than quaternary ammonium compounds is provided in Formula X of Table I of U.S. Pat. No. 5,714,360, the disclosure of which is incorporated herein by reference. By reference to the empirical formula provided above, it can be seen that $R^3$ in Formula X would be a lone pair of electrons, in order to provide a tertiary amine group, and $R^2$ would contain a charged sulfonate group in a radical of the formula $—CH_2—CH_2—SO_3Na$. Sufficient overall charge to render the compound water soluble is provided by the negative charge of the remote sulfonate group.

A suitable charged group for use in preparing compounds of the present invention is a quaternary ammonium group. The term "quaternary ammonium," as used herein, refers to organic derivatives of $NH_4^+$ in which the hydrogen atoms are each replaced by radicals, thereby imparting a net positive charge on the radical. The remaining counter-ion can be provided by any suitable anionic species, such as a chloride, bromide, iodide, or sulfate ion.

In an embodiment, two or more photoactivatable groups are provided by the X groups attached to the central Y portion of the photoactivatable compound. Upon exposure to a suitable light source, each of the photoactivatable groups are subject to activation. The term "photoactivatable group," as used herein, refers to a chemical group that responds to an applied external ultraviolet or visible light source in order to undergo active specie generation, resulting in covalent bonding to an adjacent chemical structure (via an abstractable hydrogen).

Acceptable reagents of this type are selected from the group ethylenebis(4-benzoylbenzyldimethylammonium)dibromide (Diphoto-Diquat); hexamethylenebis(4-benzoylbenzyldimethylammonium)dibromide (Diphoto-Diquat); 1,4-bis(4-benzoylbenzyl)-1,4-dimethylpiperazineadiium dibromide (Diphoto-Diquat); bis(4-benzoylbenzyl)hexamethylenetetraminediium dibromide (Diphoto-Diquat); bis[2-(4-benzoylbenzyldimethylammonio)ethyl]-4-benzoylbenzyldimethylammonium)tribromide (Triphoto-Triquat); 4,4-bis(4-benzoylbenzyl)morpholinium bromide (Diphoto-Monoquat); ethylenebis[(2-(4-benzoylbenzyldimethylammonio)ethyl)-4-benzoylbenzylmethylammonium]tetrabromide (Tetraphoto-Tetraquat); 1,1,4,4,-tetrakis(4-benzoylbenzyl) piperazinediium Dibromide (Tetraphoto-Diquat); and N,N-bis[2-(4-benzoylbenzyloxy)ethyl]-2-aminoethanesulfonic acid, sodium salt (Diphoto-Monosulfonate), and analogs (including those having alternative counter ions) thereof, corresponding to Compounds II through X, respectively, of the above-captioned '360 patent. Terms such as "Diphoto-Diquat" are used herein to summarize the number of respective groups (e.g., photo groups, quaternary ammonium groups, etc.) per reagent molecule.

Photoactivatable groups respond to a specific applied external ultraviolet or visible light source to undergo active specie generation with resultant covalent bonding to an adjacent chemical structure, e.g., as provided by the same or a different molecule. Photoactivatable species are those groups of atoms in a molecule that retain their covalent bonds unchanged under conditions of storage but that, upon activation by a specific applied external ultraviolet or visible light source, form covalent bonds with other molecules.

Photoactivatable groups generate active species such as free radicals and particularly nitrenes, carbenes, and excited states of ketones upon absorption of electromagnetic energy. Photoactivatable groups can be chosen to be responsive to various portions of the electromagnetic spectrum, and photoactivatable species that are responsive to the ultraviolet and visible portions of the spectrum can be utilized and can also be referred to herein as a "photochemical group" or "photogroup."

Photoactivatable aryl ketones can be used, such as acetophenone, benzophenone, anthraquinone, anthrone, and anthrone-like heterocycles (i.e., heterocyclic analogs of anthrone such as those having N, O, or S in the 10-position), or their substituted (e.g., ring substituted) derivatives. Examples of such aryl ketones include heterocyclic derivatives of anthrone, including acridone, xanthone, and thioxanthone, and their ring substituted derivatives. Thioxanthone, and its derivatives, having excitation energies greater than about 360 nm are utilized in some embodiments.

The functional groups of such ketones are readily capable of undergoing the activation/inactivation/reactivation cycle described herein. Benzophenone is an exemplary photoactivatable moiety, since it is capable of photochemical excitation with the initial formation on an excited singlet state that undergoes intersystem crossing to the triplet state. The excited triplet state can insert into carbon-hydrogen bonds by abstraction of a hydrogen atom (from a device surface, for example), thus creating a radical pair. Subsequent collapse of the radical pair leads to formation of a new carbon-carbon bond. If a reactive bond (e.g., carbon-hydrogen) is not available for bonding, the ultraviolet light-induced excitation of the benzophenone group is reversible and the molecule returns to ground state energy level upon removal of the energy source. Photoactivatible aryl ketones such as benzophenone and acetophenone are of particular importance inasmuch as these groups are subject to multiple reactivation in water and hence provide increased coating efficiency.

The photoactivatable compound is typically used in the range of 0.1-5 mg/ml. Solvents for the photoactivatable compound include water, alcohol, other suitable solvents, and mixtures thereof and are compatible with the device subject to the grafting/coating procedure. The solution containing the photoactivatable compound can be added to the container 14 in an amount sufficient to coat the device.

Once the container 14 is filled with the solution containing the photoactivatable compound in an amount sufficient to cover the device, the container 14 can be moved on the conveyor track 16 to the irradiation station 32. The conveyor track 16 can be operated at a particular speed so that the device is immersed in the solution containing the photoactivatable compound for a predetermined time prior to exposure to the radiation source.

Irradiation of the device in the presence of the solution of photoactivatable compound is performed at the irradiation station 32. The container 14 is transported to the irradiation station 32 when the radiation shield 52 is in the up position. The container 14 can be properly situated by the irradiation station 32 by any suitable mechanism, for example by a sensor on the irradiation station which causes the conveyor track 16 to pause, or by setting the conveyor track 16 to travel a defined distance and coordinating the positioning of the irradiation station 32 and the container 14. The radiation shield 52 can then be lowered to surround the container 14. The radiation power supply 44 is then activated to provide light via the radiation emitter 40.

The device in the container 14 can be irradiated for an amount of time suitable to activate and covalently bind the photoactivatable compound to the device. The amount of ultraviolet light provided activates at least one photoactivatable group on the photoactivatable compound wherein the activated photoactivatable group reacts with the surface of the substrate and forms a covalent bond. Activated unreacted photoactivatable groups of a bound photoactivatable compound can return to a ground state and can be subsequently activated by irradiation. Typically, the device is irradiated for a period of 1-3 minutes, a dose of 1-3 $mW/cm^2$. The device is typically maintained at a distance of approximately 4-12 inches from the light output. Generally, the device should not be subjected to excessive irradiation as it may alter the material of the device and alter its structure.

Following irradiation, the container 14 can be moved from or maintained at the irradiation station 32. In one embodiment, the container 14 is maintained at the irradiation station 32 and, with the radiation emitter 40 in the off position, a solution containing a polymerizable compound is manually added to the container. Following the addition of the polymerizable compound, an inert gas is bubbled through the solution for a period of time sufficient to purge the majority of oxygen from the solution. This time can be approximately 10 minutes or more. After purging the radiation emitter 40 is turned on.

After the photoactivatable compound has been covalently bound to the device, in some embodiments the solution is removed from the container 14. The solution can be removed manually, for example, by removing the container 14 from the apparatus and decanting the solution, or can be removed through use of a solution maintenance station 60. Following bonding of the photoactivatable compound to the device, the container 14 can, for example, be transported away from the irradiation station 32 via the conveyor track 16 and to the solution maintenance station 60 where the solution can be removed. The container 14 can be connected to the liquid supply port 40 and the solution can be recycled into the first reservoir 72 or can be disposed of.

In some embodiments, the device can be washed after binding the photoactivatable compound to the device. In one embodiment, when the container 14 is connected to the solution maintenance station 60, a wash solution from the second reservoir 78 can be pumped into the container 14. The wash solution can be any liquid suitable for removing excess unbound photoactivatable compound from the device and container 14. The wash solution can then be discarded, or recycled into the second reservoir 78. The wash process can be repeated one or more times. In another embodiment, the wash step can be performed manually.

After the photoactivatable compound has been bound to the device, a solution containing a polymerizable compound can be added to the container 14 having the device. In some embodiments the solution can be added manually, for example by adding solution to the container 14 and decanting the solution. In other embodiments the solution can be added through use of a solution maintenance station 60 when the container 14 is connected to the solution maintenance station 60. A solution containing a polymerizable compound from the third reservoir 82 can be pumped into the container 14. The solution containing a polymerizable compound can be added to the container 14 in an amount sufficient to cover the device.

During or after the addition of the solution containing the polymerizable compound, gas can be bubbled through the container 14. Valve switch 36 can be actuated to allow the flow of gas from the gas supply line 24 into the container 14 having the solution. According to the invention, gas is bubbled through the container 14 in an amount sufficient to purge oxygen from the solution. The solution can be purged for an amount of time sufficient to reduce oxygen content in the solution to a level wherein polymerization of the polymerizable compound is not inhibited. The container 14 can be transported on the conveyor track 16 while the gas is bubbling through the solution. The speed of the conveyor track 16 can be controlled so that gas is bubbled through the solution for a sufficient amount of time before the device is irradiated.

Irradiation of the device in the presence of the solution of polymerizable compound is also performed at the irradiation station 32. Gas can be continuously bubbled through the solution in the container during this step. The device in the container 14 can be irradiated for an amount of time sufficient to activate the reactive photoactivatable groups of the bound photoactivatable compound and cause the polymerization of the polymerizable material on the surface of the device.

The polymerizable compound is provided to the container at a concentration in the range of 0.1-100%, depending on the grafting initiator used. The solvent for the solution is typically water. The amount of energy delivered in order to promote polymerization is typically more than the step of bonding the grafting initiator to the device. Irradiation time is approximately 1-5 minutes.

After coating the device with the polymerizable material the solution containing the polymerizable material can be recycled to a solution reservoir or can be discarded.

It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments.

We claim:

1. A method for coating an object with a polymer layer comprising:

placing the object into a container;

filling the container with a first solution comprising a non-polymeric grafting initiator comprising at least one photoinitiator group capable of generating a free radical active species upon absorption of electromagnetic energy, wherein the photoinitiator group is selected from the group consisting of an initiator that is insoluble in polar solvent; and a negatively charged initiator;

irradiating the container having the first solution and the object, resulting in the grafting initiator binding to the object;

removing the first solution from the container;

filling the container with a second solution comprising a polymerizable monomer having at least one free-radical polymerizable group; and irradiating the container having the second solution and the object, wherein the non-polymeric grafting initiator acts as a photoinitiator for a free-radical polymerization reaction, resulting in the polymerization of the polymerizable monomer and formation of a polymer layer on the object.

2. The method of claim 1, wherein the non-polymeric grafting initiator is selected from 4,5-bis(4-benzoylphenylmethyleneoxy)benzene-1,3-disulfonic acid dipotassium salt; 2,5-bis(4-benzoylphenylmethyleneoxy)benzene-1,4-disulfonic acid dipotassium salt; 2,5-bis(4-benzoylphenylmethyleneoxy)benzene-1-sulfonic acid mono (or di-) sodium salt; and combinations thereof.

3. The method of claim 1, further comprising bubbling an inert gas through the first solution to remove non-inert gas from the first solution.

4. The method of claim 1, further comprising bubbling an inert gas through the second solution to remove non-inert gas from the second solution.

5. The method of claim 1, further comprising rinsing the object.

6. The method of claim 1, wherein filling the container with the first solution includes adding an amount of the first solution sufficient to surround the object.

7. The method of claim 1, wherein filling the container with the second solution includes adding an amount of the second solution sufficient to surround the object.

8. A method for coating an object with a polymer layer comprising the steps of:

establishing fluid communication between a container and a fluid maintenance station, the container having the object disposed therein;

dispensing a first solution into the container from the fluid maintenance station, the first solution comprising a non-polymeric grafting initiator comprising at least one photoinitiator group capable of generating a free radical active species upon absorption of electromagnetic energy, wherein the photoinitiator group is selected from the group consisting of an initiator that is insoluble in polar solvent; and a negatively charged initiator;

interrupting fluid communication between the container and the fluid maintenance station;

irradiating the container resulting in the grafting initiator binding to the object;

re-establishing fluid communication between the container and the fluid maintenance station;

removing the first solution from the container and dispensing a second solution into the container from the fluid maintenance station, the second solution comprising a polymerizable monomer having at least one free-radical polymerizable group; and interrupting fluid communication between the container and the fluid maintenance station; and irradiating the container, wherein the non-polymeric grafting initiator acts as a photoinitiator for a free-radical polymerization reaction resulting in the polymerization of the polymerizable monomer and formation of a polymer layer on the object.

9. The method of claim 8, wherein the non-polymeric grafting initiator is selected from 4,5-bis(4-benzoylphenylmethyleneoxy)benzene-1,3-disulfonic acid dipotassium salt; 2,5-bis(4-benzoylphenylmethyleneoxy)benzene-1,4-disulfonic acid dipotassium salt; 2,5-bis(4-benzoylphenylmethyleneoxy)benzene-1-sulfonic acid mono (or di-) sodium salt; and combinations thereof.

10. The method of claim 8, further comprising conveying the container to an irradiation station.

11. The method of claim 8, further comprising bubbling inert gas through the first solution in the container to remove non-inert gas.

12. The method of claim 8, further comprising bubbling inert gas through the second solution in the container to remove non-inert gas.

13. The method of claim 8, further comprising conveying the container from the fluid maintenance station to an irradiation station.

14. The method of claim 8, further comprising conveying the container from an irradiation station to a fluid maintenance station.

15. A method for coating an object comprising the steps of:

placing the object into a translucent container attached to a conveyor mechanism;

conveying the translucent container to a fluid maintenance station and filling the translucent container with a first solution comprising a non-polymeric grafting initiator comprising at least one photoinitiator group capable of generating a free radical active species upon absorption of electromagnetic energy, wherein the photoinitiator group is selected from the group consisting of an initiator that is insoluble in polar solvent; and a negatively charged initiator;

conveying the translucent container to an irradiation station and irradiating the container, resulting in the grafting initiator binding to the object;

conveying the translucent container to the fluid maintenance station and removing the first solution from the container and filling the container with a second solution comprising a polymerizable monomer having at least one free-radical polymerizable group, said filling sufficient to surround said object with second solution; and conveying the translucent container to the irradiation station and irradiating the translucent container wherein the non-polymeric grafting initiator acts as a photoinitiator for a free-radical polymerization reaction, resulting in the polymerization of the polymerizable monomer and formation of a polymer layer on the object.

16. The method of claim 15, wherein the non-polymeric grafting initiator is selected from 4,5-bis(4-benzoylphenylmethyleneoxy)benzene-1,3-disulfonic acid dipotassium salt; 2,5-bis(4-benzoylphenylmethyleneoxy)benzene-1,4-disulfonic acid dipotassium salt; 2,5-bis(4-benzoylphenylmethyleneoxy)benzene-1-sulfonic acid mono (or di-) sodium salt; and combinations thereof.

17. The method of claim 15, the conveyor mechanism comprising a conveyor track.

18. The method of claim 15, further comprising bubbling inert gas through the first solution in the container to remove non-inert gas.

19. The method of claim 15, further comprising bubbling inert gas through the second solution in the container to remove non-inert gas.

20. The method of claim 15, further comprising rinsing the object.

* * * * *